Sept. 22, 1953      E. LANGEN      2,653,114
EXTRACTION TOWER
Filed Jan. 3, 1951
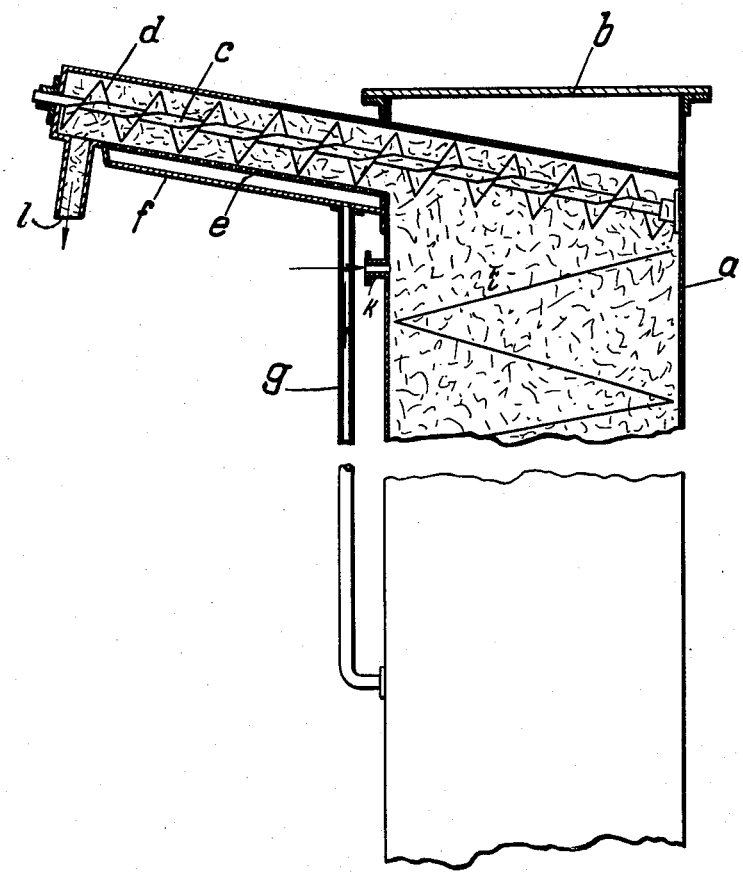
Inventor:
EUGEN LANGEN
By El Freeman
ATTORNEY.

Patented Sept. 22, 1953

2,653,114

UNITED STATES PATENT OFFICE 2,653,114

EXTRACTION TOWER

Eugen Langen, Braunschweig, Germany, assignor to Pfeifer und Langen, Elsdorf (Rhineland), Germany Application January 3, 1951, Serial No. 204,196
In Germany January 4, 1950

2 Claims. (Cl. 127—7)

1

This invention relates to an extraction tower and particularly to an extraction tower for beet chips.

It is customary to conduct the extraction liquid in these extraction towers in a countercurrent direction to the materials to be extracted, the extraction liquid flowing upwardly through the charge which travels through the tower in a downward direction.

The treated materials generally discharged from these towers by a propeller-type device pass prior to their final discharge through a dry zone. As a consequence thereof the continuity of the extraction process is interrupted, since the returned fluid will have a higher concentration than the original extraction fluid; the economy of the extraction plant is thereby greatly reduced.

It is the main object of the invention to secure continuity of the extraction procedures in extraction towers.

In compliance with this object, the extracted materials are discharged from the extraction tower in the wet state and the extraction liquid inherent in the discharged materials is returned to a portion of the extraction tower where the concentration of the extraction liquid equals that of the returned liquids.

The discharging device preferably consists of at least one inclined rotatable screw conveyor partly projecting into the extraction tower, the outer portion of the conveyor being located above a screen provided bottom; this portion may be constructed as a press.

The invention will now be described more in detail, with reference to the attached drawing illustrating a vertical sectional view of the upper portion of an extraction tower constructed in conformity therewith.

The extraction tower $a$ shown in the drawing is closed at the upper end by a cover $b$. A screw conveyor $d$ carried on an inclined shaft $c$ downwardly extends into the upper part of the tower end underneath cover $b$; the screw conveyor is housed by a casing and the bottom portion $e$ of this casing, which extends from the tower, is perforated. A trough $f$ is provided underneath the perforated bottom $e$; a tube $g$ leads from trough $f$ into tower $a$. The casing enclosing the screw conveyor is at its outer end provided with a discharge tube $l$.

The material to be extracted is charged from below into the tower $a$ and lifted in the same in countercurrent to an extraction liquid which is entered through tube $k$; in conformity with the progress of the extraction the concentration of the extraction liquid constantly increases in a downward direction.

The extracted charge is discharged by the screw propeller $c$ in the wet state. The simultaneously transported liquid drips off through the screen bottom $e$, flows into trough $f$ and through tube $g$ into a portion of the tower $a$ where the concentration of the extraction liquid corresponds to that of the returned liquid. In this manner, a maximum extraction efficiency is obtained.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patent, is as follows:

1. In an installation for the extraction of beet chips a vertical extraction tower, a tube attached to its upper closed end for the supply of the extraction liquid, a vertical axis screw conveyor in said tower to lift the chips charged into the lower portion of said tower in an upward direction and countercurrently to the downflowing extraction liquid, a slightly upwardly inclined tubular casing laterally attached to a portion of said tower located above the entrance level of the extraction liquid, a screw conveyor in said casing extending through the same and through said tower towards the opposite wall thereof for the conduct of the partly leached chips into and through said tubular casing and for the completion therein of the leaching action, a screen separator for the extracted beets and the extraction liquid in the bottom portion of said casing, a tube attached to said casing underneath said screen to return the liquid separated from said leached chips into a lower section of said tower where the concentration of the extraction liquid downflowing in said tower corresponds to the concentration of the separated and returned liquid.

2. In an installation according to claim 1, the vertical axis screw conveyor reaching with its upper end substantially into the level of the tower through which the supply tube extends for the extraction liquid.

EUGEN LANGEN.

References Cited in the file of this patent

UNITED STATES PATENTS

| Number | Name | Date |
|---|---|---|
| 1,077,296 | Paschen | Nov. 4, 1913 |
| 2,276,298 | Frazier | Mar. 17, 1942 |
| 2,602,762 | Langen | July 8, 1952 |

OTHER REFERENCES

Ware: Beet Sugar Manufacturing and Ref., volume 1, New York, 1905, page 431.

Heriot: Mfg. of Sugar From the Can and Beet, London, 1920, page 77.